United States Patent [19]

Freshcorn

[11] 4,076,164

[45] Feb. 28, 1978

[54] PRE-BLISTERING OF BRAZE JOINTS

[75] Inventor: Ivan Gene Freshcorn, Kenton, Ohio

[73] Assignee: United Aircraft Products, Inc., Dayton, Ohio

[21] Appl. No.: 789,495

[22] Filed: Apr. 21, 1977

[51] Int. Cl.$^2$ .......................... B23K 31/00; B23K 1/04
[52] U.S. Cl. .................................... 228/103; 228/125; 228/231
[58] Field of Search ............... 228/103, 125, 231, 902; 148/127

[56] References Cited

U.S. PATENT DOCUMENTS

| 1,554,546 | 9/1925 | Austin | 228/231 X |
| 2,732,323 | 1/1956 | Linnert | 228/231 X |
| 3,046,649 | 7/1962 | Brennan | 228/131 |
| 3,621,176 | 11/1971 | Valente | 228/125 X |
| 3,948,433 | 4/1976 | Palmers | 228/125 X |

FOREIGN PATENT DOCUMENTS 982,916  2/1976  Canada ................................ 228/231

Primary Examiner—Donald G. Kelly
Attorney, Agent, or Firm—J. E. Beringer

[57] ABSTRACT

A method, in the art of brazing metallic parts to one another, including a step of subjecting a brazed assembly to relatively high temperatures over a relatively short period of time in a manner to induce blistering of unbrazed or weakly brazed areas. Blistered material can then be removed, leaving a soundly brazed structure which in use will not fragment and give up loose materials to ambient surroundings.

10 Claims, 5 Drawing Figures

U.S. Patent    Feb. 28, 1978    4,076,164
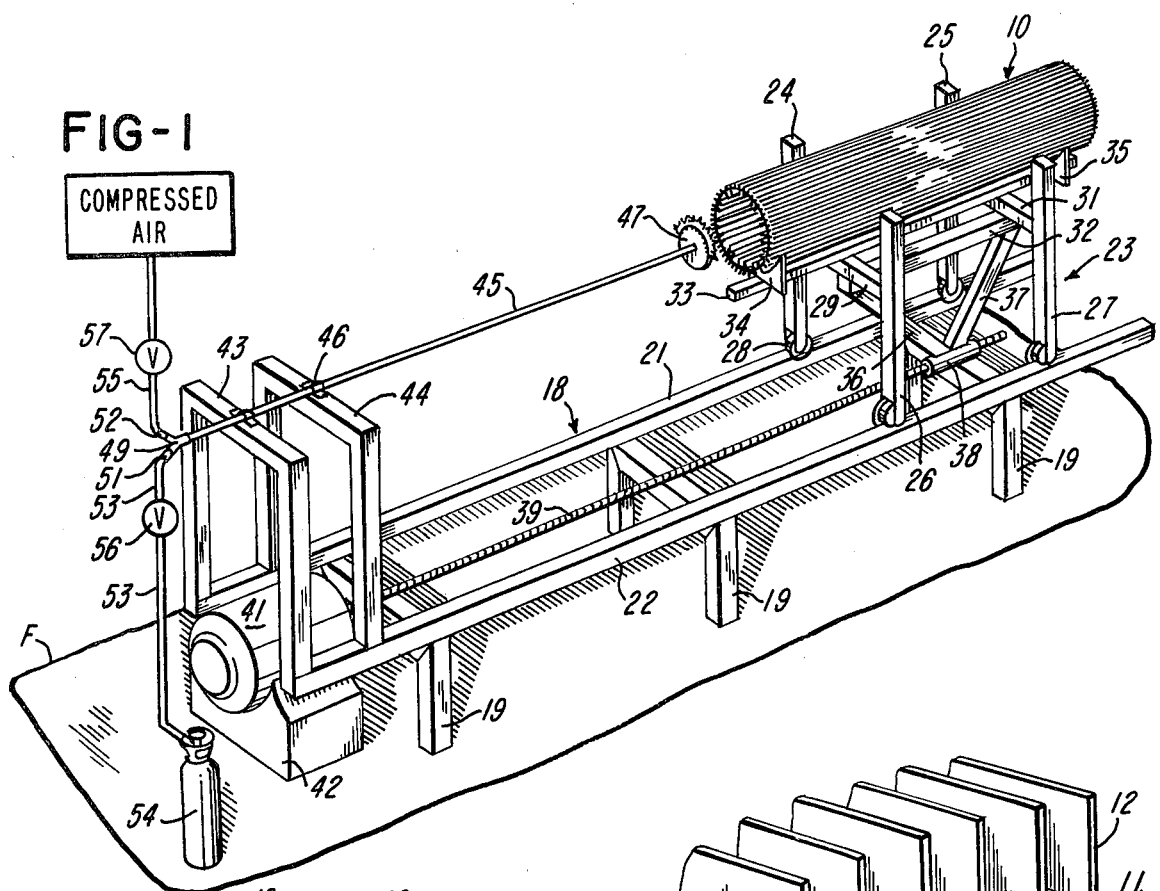
FIG-1
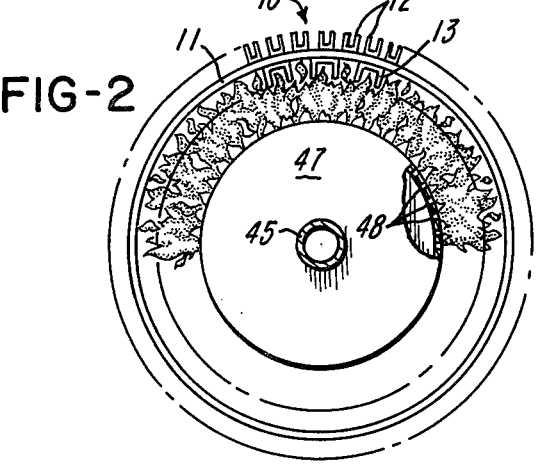
FIG-2
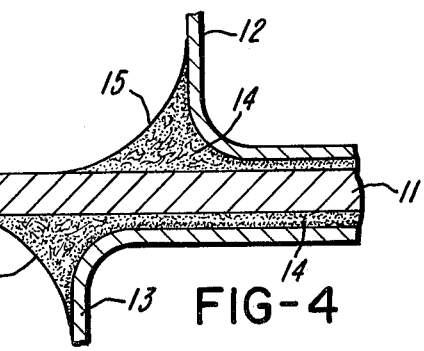
FIG-3
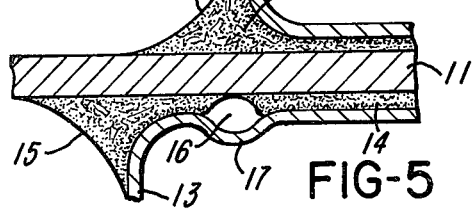
FIG-4
FIG-5

PRE-BLISTERING OF BRAZE JOINTS

BACKGROUND OF THE INVENTION

The invention has particular although not limited reference to systems in which a relatively high temperature, confined fluid flows over a heat transfer surface, fin material being brazed to the surface for an improved coefficient of heat transfer from the flowing fluid to and through the transfer surface.

In the use of such systems the fins should be soundly brazed to the heat transfer surface. This is important for heat transfer considerations, of course, but it also important to avoid problems brought about by fragmented fin material becoming entrained in the flowing fluid and having disruptive or damaging effects in the system downstream of the heat transfer surface.

A braze alloy defines with joined parts a braze joint. Ideally, the braze joint is dense and free of voids. In actual practice, however, voids do occur praticularly at locations of entrapped organic matter, as for example oil, grease, flux and like materials. In use, and under conditions of high temperature cycling, foreign materials in the braze joint vaporize, and, in expanding, form pressure pockets. These appear as visually distinguishable blisters on brazed fin portions. The fin material is weakened at blister locations and under the effects of vibration, fluid flow and pressure, can disintegrate and become entrained in the flowing fluid. Rising temperatures also produce expansion stresses, particularly when the fin and heat transfer surface are made of different material, and these stresses seek voids and result also in surface irregularities which may generally be termed blisters. Weakly brazed areas appear when inadequate clamping results in localized poor contact of brazed parts with one another during the brazing process. These areas, too, are subject to blistering and fragmenting in use.

SUMMARY OF THE INVENTION

The instant invention contemplates an improvement in the brazing art in that the joining of parts in a brazing process is followed by steps of pre-blistering and removal of weakened material whereby subsequent actual use of a brazed unit may be free of blister caused problems.

In the exemplary process, a brazed joint is heated rapidly to a high temperature, conditions of time and temperature being selected which as applied to the materials of the joint will create blistering without destroying joined materials.

The blistered portions are visually apparent, and, in a following operation, these are removed, leaving only soundly brazed portions. According to a feature of the invention, the blistering step is carried out using apparatus providing a timed application of heat in the desired specifics and in a generally automatic manner. In a particular application, dealing with a large joint of longitudinal extent, an open flame is applied to the work and relative motion of the flame and work induced for a controlled and timed application of the flame to successive portions of the joint.

It is an object of the invention to provide a pre-blistering method, in the brazing art, substantially as above indicated.

Other objects and structural details of the invention will appear from the following description when read in connection with the accompanying drawings, wherein:

FIG. 1 is a view in perspective showing apparatus carrying out the method of the invention according to an illustrative embodiment thereof;

FIG. 2 is an enlarged end view showing a tubular brazed unit being heated for pre-blistering;

FIG. 3 is a fragmentary detail view of the brazed unit;

FIG. 4 is an enlarged view in cross section showing a soundly brazed, unblistered joint portion in the brazed unit; and FIG. 5 is a view like FIG. 4, showing a weakly brazed joint portion pre-blistered according to a practice of the invention.

In its illustrative embodiment, the invention concerns itself with a brazed heat exchanger 10 comprising a relatively elongated cylinder 11 to outer and inner surfaces of which are brazed fins 12 and 13 respectively. In a use thereof, the heat exchanger 10 is installed to be a part of a duct flowing a relatively high temperature fluid. The fluid flows through the cylinder 11 and accordingly is in contact with the inner cylinder wall and with the generally radially orienting fins 13 thereon. The exterior of the heat exchanger may be exposed to ambient surroundings, but, more conventionally, will be enclosed by a manifold through which another, lower temperature, fluid is circulated. The other fluid accordingly circulates in contact with the outer cylinder wall and with the generally radially orienting fins 12 thereon. A transfer of heat from the fluid of higher temperature to the fluid of lower temperature occurs, in a conduction-convection process utilizing the materials of the cylinder and fins. As will be understood, the fins 12 and 13 aid in the heat transfer process in that they effectively define radial extensions of the heat transfer surface provided by cylinder 11. The efficiency with which the fins serve their intended purpose is in large part determined by the excellence and continuity of the bond they make with cylinder 11.

The cylinder 11 is made of a material having good heat conductivity and resistance to attack by the fluid with which it is in contact. It must, moreover, have the ability to retain its integrity in the presence of maximum expected pressure and temperature differences as between the inner and outer fluids, and, for many applications, should be made of a lightweight material. The fins 12 and 13 have not the strength requirements of cylinder 11 and so can be made of relatively thin, ductile material yielding very good heat conductivity but not adding appreciably to the weight of the heat exchanger. They should, however, be made of a material compatible with that of the cylinder 11 in that secure bonding of the fins to the cylinder is possible using conventional materials and techniques. In one actual embodiment of a heat exchanger, cylinder 11 is made of a titanium alloy, fins 12 and 13 of an aluminum alloy, and another aluminum alloy is used to braze the fins to the cylinder.

The fins 12 and 13 are generally U-shaped in cross section and orient in a sense longitudinally of the cylinder. Closed bottom portions of the fins seat to respective outer and inner cylinder wall surfaces. A continuing circumferential series of fins is presented, both interiorly and exteriorly of the cylinder.

In fabricating the heat exchanger, an open ended cylinder 11 is provided and preformed fins 12 and 13 are placed on outer and inner surfaces thereof, in circumferential array substantially as illustrated. Suitable fixturing or clamping devices are used mechanically to hold the fins in position and these desirably exert a firm clamping pressure which is applied uniformly to the multiple fins and which is uniform from end to end of each fin. Also incorporated in the assembly is a braze alloy, this being a material which when heated to a predeterminable temperature flows into a close, intimate contact with parts to be joined, the braze alloy having a flowing or melting temperature which is less than corresponding temperatures for either of the parts with which it is in contact. The braze alloy can be variously incorporated into the assembly, as for example by providing it in a flexible sheet or foil-like form and in this form using it to line the inner cylinder surface and to wrap the outer cylinder surface prior to positioning and clamping the fins 13 and 12 thereto. Thus, when the fins are clamped to the cylinder, they actually are separated from direct contact with respective cylinder surfaces by intervening foil-like sheets of braze alloy. The actual joining process is effected by raising the temperature of a fully assembled heat exchanger to a value sufficient to reduce the braze alloy to a flowable condition. This can be done in various ways, as by immersing the assembled heat exchanger in molten flux. The flux provides the necessary heat and at the same time scrubs aluminum surfaces so that they are free of aluminum oxides, which, if not removed, inhibit the obtaining of a good braze joint. In another method, a fully assembled heat exchanger is placed in a furnace and the furnace temperature raised to the brazing value. In this instance, the problem of aluminum oxide films is dealt with by preliminary cleaning of part surfaces and by heating in a vacuum or by heating in an atmosphere from which oxygen has been purged and in which another, relatively non-reactive, gas has been substituted. In any event, and however heating has been accomplished, when the assembly has been removed from the flux bath or from the furnace and allowed to cool, the material of the braze foil will be found to have distributed itself in close, intimate contact with mating surfaces of the cylinder and fins. An interconnecting layer 14 is established which includes unbroken fillets 15 along the fin lengths. The composite metal article accordingly assumes a unitary character in which the fins 12 and 13 are securely fastened to the cylinder 11 in a bond continuous over the length thereof. A solid joint moreover offers minimal resistance to a free flow of heat between the cylinder and the fins mounted thereto. A sound, well defined joinder of fins to a mounting cylinder is illustrated in FIG. 3 where parts are shown relatively enlarged and with a use of some exaggeration in order that the presence of the interconnecting braze material may be more clearly seen and understood. A braze joint is established between the cylinder and each fin and this joint may be regarded as comprising braze alloy material of the layer 14 and interconnected fin and cylinder materials.

The braze joint should be uniformly dense and free of voids. Such a structure promotes a good, uninhibited transfer of heat between fin and cylinder. Additionally, however, it makes a secure bond of the fin to the cylinder. If this bond is at some locations weak or insecure, fin portions can become detached from the cylinder, particularly under conditions of use. Such localized separation of joined parts is sometimes termed blistering since it may be evidenced by a visible bulging or distortion of fin material. Conditions susceptible of blistering can be provided if the fins are not firmly and uniformly seated to the cylinder during the heating or brazing step. Also, if affected fin and cylinder surfaces are not thoroughly clean, particles of organic material or flux particles may become trapped in the braze joint. Under high temperature use conditions, the foreign material is vaporized. Pressure pockets are formed which as they expand in size bulge out fin material giving a blistering effect. Such an effect is illustrated in FIG. 5, where a pressure pocket 16 has produced a blister 17.

Conditions of use of a heat exchanger as disclosed are frequently severe and may include vibration, high temperature cycling in which the higher temperature fluid is repeatedly raised to and lowered from a high temperature value, and turbulent and pressured fluid flows. The high temperature cycling results in weakly brazed and unbrazed locations becoming identified and causes blistering of the fin material at those locations. Blistered portions are susceptible to tearing and fragmenting under other use conditions, and fin fragments may break away from the heat exchanger and be entrained in the flowing fluid. This is frequently undesirable, especially in respect of the ducted fluid flowing through cylinder 11, since fin fragments may have a damaging effect on system components downstream of the heat exchanger.

The instant invention has in view a pre-blistering of brazed assemblies. In this way, weakly brazed and unbrazed fin portions can be detected and removed before the heat exchanger is put in service. The heat exchanger as actually installed and used, therefore, presents on the cylinder surfaces only soundly brazed fins. The likelihood of damage resulting from fragmented fin material is thereby greatly minimized, if not eliminated.

A brazed heat exchanger may provide no indication of the presence of flaws in its brazed joints. It is impractical to reproduce exact conditions of actual use and of course the time and apparatus involved in searching for and remedying flaws should not be so long and so elaborate as to add excessively to the cost of the heat exchanger. With these facts in mind, the instant invention introduces a principle of pre-blistering wherein a heat exchanger may be subjected to a simulated use conditions causing blistering at defective joint locations. Conditions of time and temperature are established enabling the pre-blistering operation to be carried out quickly and with no damage to soundly brazed fin material. Apparatus involved is simple and inexpensive and consists of readily available and easily fabricated components.

As before indicated, in the case of the heat exchanger of the illustrated embodiment a concern of fragmented, lost material from the interior fins 13 of the heat exchanger is greater than that relative to exterior fins. The apparatus of the invention accordingly concerns itself with a pre-blistering of interior fins although it will be evident that generally similarly principles can be applied in a pre-blistering of external fins. Also, apparatus to perform the method of the invention may take various forms. In the illustrated example, a frame 18 is mounted on a floor F. The frame 18 includes a series of longitudinally spaced apart legs 19 which support rails 21 and 22 in a parallel spaced apart relation. Supported for movement on the rails 21 and 22 is a carrier unit 23. This unit includes upright members 24–27 arranged in pairs of members 24–25 and 26–27 associated respectively with the rails 21 and 22. The several upright members have wheels 28 at their lower ends in rolling engagement with the rails 21 and 22. Upright members 24 and 26 are interconnected by a cross member 29 and upright members 25 and 27 are interconnected by a cross member 31. The cross members 29 and 31 are in turn interconnected by a member 32 of longitudinal extent. The result is to provide an interconnected and braced carrier movable as a unit longitudinal along the rails 21 and 22. The carrier unit further includes a longitudinal bar 33 mounting configured members 34 and 35, the members 33-35 cooperating with one another to define a cradle on which a heat exchanger 10 may be supported substantially as illustrated. Still further, the carrier unit 23 includes dependent convergent-divergent members 36 and 37 which at their lower ends are joined to an elongated nut 38. A screw shaft 39 is in threaded engagement with nut 38 and extends longitudinally between the rails 21 and 22 toward one end of the frame 18. There it has a driven relationship with a motor 41 supported by a floor mounted block 42. The means to power motor 41 are not here illustrated but it will be understood that the motor is or may be a conventional electrically energizable motor which when energized rotates the screw shaft 39. Rotation of the shaft 39 in nut 38 is effective, as will be evident, to move carrier unit 23 along the rails 21 and 22, this motion being facilitated by the presence of rotary wheels 28. Within concepts of use of the present apparatus, the motor 41 is reversible and rotates screw 29 in selectively opposite directions. Operation of the motor accordingly may be used to move carrier unit 23 both in advancing and retracting directions relative to that end of the frame 18 at which motor 41 is positioned.

In a position generally overlying motor 41 is a pair of longitudinally spaced apart support members 43 and 44 based at their lower ends on rails 21 and 22. The members 43 and 44 support a pipe 45. Brackets 46 on the members 43 and 44 hold the pipe 45 in a position substantially to align with the axis of a heat exchanger 10 as supported on the carrier unit 23. Pipe 45 extends a substantial distance at one end toward what may be regarded as an outer end of frame 18 or toward that end opposite motor 41. At the outer end of the pipe is a circular burner head 47 which assumes a position substantially concentric with heat exchanger 10. The burner head is a hollow member which over substantially the upper half of its circumference has radial apertures 48. At an opposite end thereof, the pipe 45 terminates in a fitting 49 having a pair of inlets 51 and 52. Inlet 51 in turn has a pressure fluid conducting line 53 attached thereto leading from a container 45 holding propane or like fuel under pressure. Inlet 52 communicates with a line 55 leading from a source of compressed air. In line 53 is an adjustable flow control valve 56. In line 55 is an adjustable flow control valve 57. In a proportioned regulated flow, propane from tank 54 and air from the compressed air source are admitted to fitting 49 and thereby to pipe 45. The fluids accordingly are combined and in a mixed form flow through pipe 45 to burner head 47 where the air-gas mixture is allowed to escape through apertures 48. The escaping mixture is, of course, combustible, and, when ignited, results in a discharge of flame jets radially outwardly of the burner head. The apertures 48 are sufficiently close together and the pressure of the discharging mixture is such that individual flame jets tend to merge with one another and to define in effect a single sheet of flame across the top half of the burner head.

Assuming a relationship of parts substantially as shown in FIG. 1, if motor 41 is activated to rotate screw shaft 39 in an appropriate direction, the carrier unit 23 will be moved along rails 21 and 22 toward the motor end of the frame. In response to this motion, the burner head 47 is received in the heat exchanger 10, and, as the advancing motion of the carrier unit is continued, the burner unit effectively traverses the full length of the heat exchanger. In the process, the upper half portion of the heat exchanger cylinder interior is heated by the discharging flame and it will be seen by reference to FIG. 2 that the construction and relationship of the parts is such that the discharging flame substantially envelops the interior fins 13 and the braze joints by which these fins are bonded to the cylinder 11.

The flame discharged from burner head 47 is a sheet-like flame which at any one time contacts a relatively short longitudinal segment of the heat exchanger surfaces. It is a relatively intense flame, however, and it will be understood that the air and gas flow rates and pressures are predetermined, and the spacing between the burner periphery and the cylinder wall also predetermined, so that a selected, desired temperature is achieved at the braze joints where the fins attach to the cylinder. As a still further controlled variable, the speed of operation of the motor 41 is controlled to achieve a predetermined rate of movement of the heat exchanger relative to the burner head. All of these factors enter into effective operation of the apparatus, the result of which is progressively to heat the flame enveloped braze joints to a temperature sufficiently high for the intended purposes without, however, allowing the temperature to be maintained at or to rise to a level destructive of the fin material. Using the illustrative example before mentioned in which the heat exchanger is comprised of a titanium alloy cylinder and mounted fins of an aluminum alloy, the various controlled factors may be utilized to apply a temperature on the order of 1850° to 1950° F at the braze joint. This has the effect of raising the temperature at the braze joint to a value on the order of 775° to 825° F in a period of time on the order of five to seven seconds. With the speed of travel of the carrier unit 23 set to produce this time of exposure, and with air-gas flow rates and burner dimensions appropriately established, therefore, the interior of the heat exchanger is progressively heated to a temperature value on the order of 800° F. This is a temperature value which is non-destructive of the aluminum fin material but sufficient to produce blistering in the braze joint where parts are weakly brazed or where foreign material in the joint is vaporized and produces pressure pockets.

When the full length of the heat exchanger has been traversed by the burner head 47, the carrier unit 23 is retracted to a starting position as shown in FIG. 1 and in connection with this operation the discharge of flame from the burner head may temporarily be discontinued. In a retracted position of the carrier unit, the heat exchanger is rotated approximately 180° so that the lower portion of the heat exchanger heretofore not directly affected by discharging flame from the burner head is now uppermost. Advancing and retracting motion of the carrier unit, in the presence of flame discharged from the burner head 47 are now repeated and the other half of the heat exchanger interior is subjected to heat for pre-blistering purposes. At the conclusion of these steps, the interior of the heat exchanger is inspected and loosened and blistered fin portions are removed in any appropriate manner, as by physically cutting them out of or away from the cylinder surface. At the conclusion of this removal operation, the heat exchanger is left with only soundly brazed fin material on the interior cylinder surface. The heat exchanger may accordingly be put in service with assurance that fin material will not blister and fragment in use. It may be noted in this connection that a consideration in the design of the heat exchanger is that the desired heat transfer efficiency may be achieved with a fin area somewhat less than that provided in the original brazing. Thus, if it is necessary, for example, to cut away some 5% of provided fin surface this may be acceptable if design parameters allow a reduction of fin material on that order.

The jet apertures 48 in the burner head have been described as occupying only the upper half of the head periphery. It has been noted that the heat exchanger is in a pre-blistering operation rotated so that inner half portions thereof are successively exposed to the discharging flame. This arrangement arises from problems inherent in obtaining a uniform flame pattern over 360° of the head circumference. To assure continuous and uniform flame contact over at least 180° of the heat exchanger interior, the apertures 48 may be provided in a somewhat longer arc, as for example in an arc of about 210°.

It has also heretofore been noted that concepts like that here disclosed may also be used in the pre-blistering of exterior braze joints should this be found necessary or desirable. For example, a suitably supported heat exchanger could be moved relatively to a burner head in the form of a configured member underlying the heat exchanger. It is not considered, moreover, that the invention is limited to use in connection with an apparatus as shown in FIGS. 1 and 2 or in connection with any specific form of apparatus. In its broader aspects, the invention deals with a method of pre-blistering brazed structures offering distinct and important advantages in the manufacture of brazed assemblies, including heat exchangers, and has an existence broadly independent of apparatus for putting the method in practice.

I claim:

1. In the art of brazing metallic parts using a braze alloy to bond the parts together along a braze joint, the steps of subjecting a brazed joint to a relatively high and rapid temperature rise inducing blistering at locations of imperfect braze, and removing material loosened as a result of blistering.

2. A method according to claim 1, wherein the braze joint is subjected to a heat sufficient to raise the temperature at the joint to a blistering value within a period of time on the order of five to seven seconds.

3. A method according to claim 2, wherein said step of raising the temperature at braze joint is accomplished by applying an open flame directly to the joint.

4. A method according to claim 3 wherein one of said parts is a relatively thin heat transfer fin made of an aluminum material and said braze alloy is an aluminous material, the applied temperature being one to raise the temperature of the brazed fin area to 775° to 825° F within the stated time period.

5. A method according to claim 4, wherein said brazed parts comprise a work unit on which said fin appears as an exposed elongate member, the flame heat being applied by providing a burner means, effecting relative motion of the burner means and the work unit at a speed selected to produce desired time and temperature effects, and orienting said burner means relative to said work unit so that the flame thereof is directed upon the brazed fin area and moves progressively thereover in response to the effected relative motion.

6. A method according to claim 5, wherein said work unit is a tubular device on the inner surface of which plural fins appear in substantially radial orientation, said burner means being an apparatus structured to discharge flame in radial jets from the periphery thereof and being positioned telescopically to be received in said work unit and to position a peripheral portion thereof a selected distance from the inner surface of said tubular device.

7. A method according to claim 6, wherein the flame discharged by said burner means is provided by mixing a combustible gas and air at a sufficient flow to yield a temperature on the order of 1850° to 1950° F at the interface between said fins and the inner surface of said tubular device.

8. A method according to claim 1, wherein said brazed parts comprise a tubular heat exchange unit comprising a cylinder and on the inner surface of the cylinder a plurality of fins of longitudinal extent in a substantially radial orientation, portions of said fins being brazed to said cylinder, the step of subjecting brazed portions of said fins to a temperature rise being accomplished by bringing said unit into cooperative relation with a burner head discharging radially orienting flame jets, said burner head being received in said cylinder, and said burner head and said heat exchange unit being movable relatively to one another in a manner to cause said burner head to move longitudinally of said cylinder.

9. A method according to claim 8, wherein the heat generated at said burner head and the speed of relative motion between said cylinder and said burner head are controlled so that successive longitudinal portions of the brazed portions of the fins are subjected to a predetermined high temperature for a predetermined time period found correct to effect blistering without damage to soundly brazed portions.

10. A method according to claim 1, wherein gas and air are mixed and ignited to form a flame for direct heating of a brazed joint, flow of the gas and air being controlled and the relationship of the flame to the joint being controlled to achieve a desired high temperature at the joint in a relatively short length of time.

* * * * *